W. M. Davis,
Drying Sugar.

No. 65,352. Patented June 4, 1867.

Witnesses —
F. F. Field
G. H. Newhall

Wm. Morris Davis

United States Patent Office.

WILLIAM MORRIS DAVIS, OF PHILADELPHIA, PENNSYLVANIA.

Letters Patent No. 65,352, dated June 4, 1867.

IMPROVEMENT IN DRYING LOAVES OF SUGAR.

*The Schedule referred to in these Letters Patent and making part of the same.*

TO ALL WHOM IT MAY CONCERN:

Be it known that I, WILLIAM MORRIS DAVIS, of the city of Philadelphia, and State of Pennsylvania, have invented a new and useful Improvement in the Process of Drying Loaves of Sugar; and I do hereby declare that the following is a clear and exact description of the manner of carrying on said process, reference being had to the annexed drawings, making a part of this specification, in which—

Figure 1:
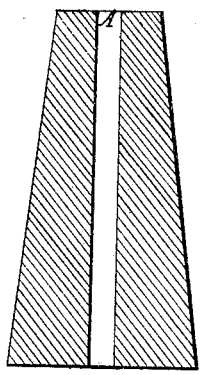
Figure 1 is a vertical section of a loaf of sugar, A being a hole or opening through the loaf of suitable size for the passage of a current of warm air.
Figure 2:
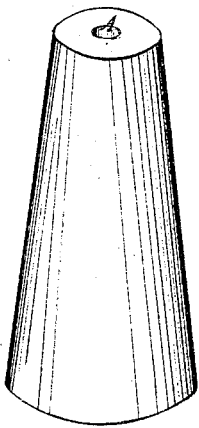
Figure 2 is a perspective view of the loaf.
Figure 3:
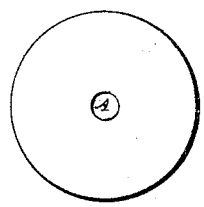
Figure 3 is a horizontal view of the base of the loaf, A being the hollow or opening above described.

Heretofore, in sugar refineries, on account of the time required to dry the large loaves in what is called "piece" moulds, the processes of the maker of "hard or stove-dried sugar" were limited to the smaller "loaf" mould from sixteen to twenty pounds, and "tettler" from thirty-five to forty-five pound moulds, which alone dry in the periods of "refines," say six days. By removing the heart or centre of a loaf as large as the "piece" loaf, weighing eighty-five pounds, by a small rotary cutting table, bit, drill, or other appropriate tool, and allowing the ascending currents of hot air to act interiorly on the heart or centre of the large loaf, it will be more rapidly and thoroughly dried, and rendered fit for the crushing and pulverizing-mills, to the manifest great saving of labor and cost of implements. I prefer to make the hole along the vertical central axis of the cone of sugar, and for a "piece" loaf, which is about fifteen to seventeen inches diameter at base, I would make a vertical cylindrical hole on said axis of two and one-half inches diameter. I prefer to drill the hole through at that stage immediately after the knocking out of the loaf from the mould, and before its passage to the stove-room. But the hole might be formed in some other manner, and it might be made in a different direction into or through the loaf, but in any case the said hole, however formed, would expedite the drying, although the central axial hole through the loaf is deemed by me to be the best.

Having thus described my improvement, what I claim as my invention, is—

Forming a loaf of sugar with a hole through or into the interior of the loaf, for the purpose of expediting the operation of drying sugar loaves.

WM. MORRIS DAVIS.

Witnesses:
G. H. NEWHALL,
JNO. W. FIELD.